3,348,424
ACTUATING MECHANISM FOR WATER TAPS
Edward Moey Schaverien, 6 Canons Drive,
Edgware, England
Filed June 28, 1965, Ser. No. 467,644
Claims priority, application Great Britain, July 10, 1964,
28,635/64
9 Claims. (Cl. 74—424.6)

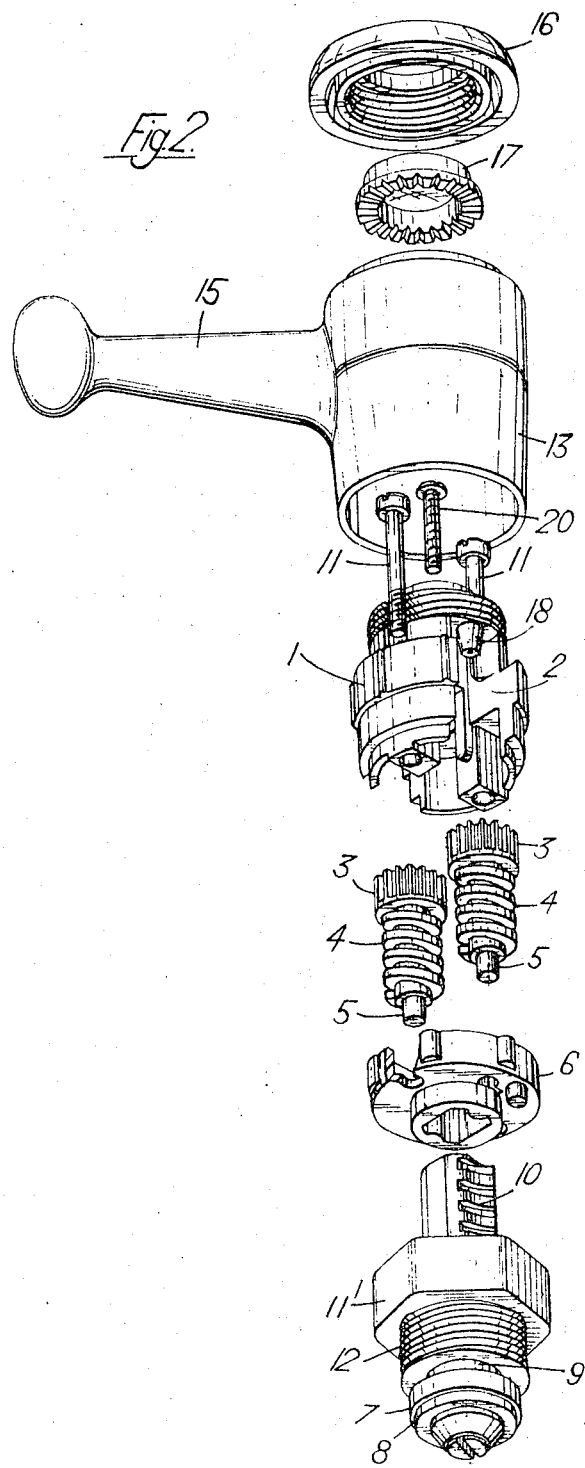

ABSTRACT OF THE DISCLOSURE

A tap has a closure member axially movable by worms driven by lever-actuated gearing, and the worms have frictional locking engagement with their bearings, when the closure member is firmly closed, to prevent inadvertent opening of the tap.

---

Figure 1:
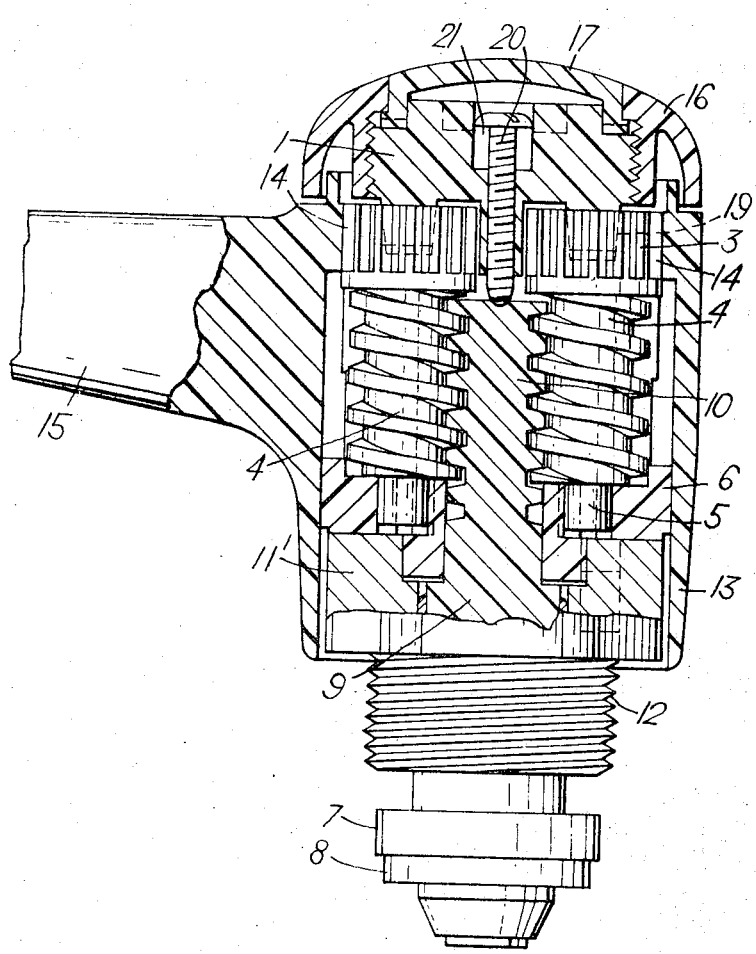

This invention relates to water taps, and more especially to taps in which opening and closing is effected by lever operation.

Forms of lever-operated taps are described in British patent specification No. 887,558 in which the lever, actuating gearing, drives worm means whereby the tap is opened and closed, and the object of the present invention is to provide a more positive shut-off action in a tap of that kind.

The invention consists in a tap for fluid flow control comprising a body, gear and worm means in said body operable to open and close the tap, and locking means, associated with said gear and worm means, adapted to be brought into operation during termination of a tap-closing operation in order to hold said gear and worm means against movement until commencement of a subsequent tap-opening operation.

Conveniently a worm-and-gear unit is mounted in the body with some clearance allowing limited axial movement. When, upon closure of the tap resulting in a sealing member engaging its seating and thus arresting flow of fluid, the operating means (e.g., a lever) is urged further in a tap-closing sense, the worm-and-gear unit is caused to move axially within the limit of its clearance, and as the result of such axial movement the locking means become operative. Reverse axial movement, initially releasing the lock, occurs when opening of the tap is subsequently effected. The locking means may be in the form of a tapered or conical pivot engaging in a socket of similar shape, as the engaging means between one end of the worm-and-gear unit and the tap body. The pivot may project from the body and the socket be provided in the adjacent end of the worm-and-gear unit, or vice versa.

The invention will be clearly understood from the following description of one form (given, however, merely by way of example) which it may assume, and this description will be more readily followed by reference to the accompanying drawings wherein.

FIGURE 1 represents in side sectional elevation the operating means of a tap in accordance with the invention; and FIGURE 2 represents in perspective in exploded positions the component parts of the tap shown in FIGURE 1.

In carrying the invention into effect in one convenient manner, as shown in the aforesaid drawings, a tap for control of flow of fluid, such as water, comprises a body 1 having on opposite sides channelled recesses 2 to receive units each comprising a gear 3 at the upper end of a worm 4. The lower ends 5 of the worm-and-gear units ride in bearing apertures in a base 6 for the body 1, and the upper ends of the units have pivot mountings described more fully below.

The sealing disc 7 of the tap fitted with a washer 8 is rigid with a slide 9 formed at its upper end with a rack 10 on each side to cooperate with the worms 4. The slide 9 is movable axially in a nut 11' which is held against the base 6 of the body when the various components are assembled and held together by screws 11. When the components are so assembled the rack member extends up between, and is engaged by, the worms 4, and it will be seen that rotation of the worms 4 by the gears 3 causes axial movements of the slide 9 with the tap-closing means 7, 8. The nut 11' has a screw-threaded boss 12, preferably adapted to engage in the conventional threaded aperture of a domestic water tap.

The body and other assembled components described above are encased in a tubular cover 13 formed with an internal toothed ring 14 which engages the gear 3. Integral with the cover 13 is an operating lever 15 by which the cover 13 can be rotated to drive the gears 3 and thus open and close the tap by operation of the worms 4 as described above. A domed lid 16 screws on to the upper end of the body 1 and may hold down a flanged disc 17 carrying indicia or information (e.g. "hot" or "cold" tap) or the like.

As so far described the tap is very similar to forms disclosed in the abovementioned patent specification No. 887,558.

According to the present invention locking means are provided to hold the worm-and-gear units 3, 4 against movement after the tap has been fully closed. For this purpose in the form of the invention illustrated in the abovementioned drawings the pivot and socket mounting of the upper end of each worm-and-gear unit is effected by a tapered or frusto-conical pivot engaging in a socket aperture of like shape. Each tapered pivot preferably projects downwards from the upper portion of the body 1, as at 18, over the side recess 2, while a like-shaped socket 19 is formed at the top of each worm-and-gear unit. The spacing between the pivots 18 and the base 6 of the body, when the parts are assembled, is such as to leave some clearance allowing small limited axial movement of the worm-and-gear units.

When the tap is being closed the lever 15 is moved to rotate the gears and worms, thereby driving down the slide 9 and sealing means 7, 8, until the latter are firmly pressed against their seating. If, thereafter, the lever 15 is urged further in the same direction the worm 4 rotates in relation to the racks 10, but since the rack slide 9 can no longer move downwards the result is that the worm-and-gear units are forced in an upward direction to secure a firm locking engagement between the tapered pivots 18 and sockets 19. Reverse movement of the lever 15 to open the tap first lowers the worm-and-gear units to ease the lock 18, 19 before the worms 4 are effective to lift the slide 9.

In conventional domestic taps to which may be fitted the assembly shown in FIGURE 1 there are frequently small dimensional differences, and to facilitate the fitting in desired manner of an assembly according to the invention it is preferred to provide limit-adjusting means which may take the form of a screw 20 extending axially through the upper end of the body 1 with its head sunk in a recess 21 in the body. The lower end of this screw 20 forms a stop limiting upward movement of the slide 9, and can be adjusted, as desired, when the tap is being installed. Subsequent adjustment is possible, if desired, but is usually unnecessary.

Except for the screws 11, 20 and the nut 11', with its boss 12, the components shown in FIGURE 2 are preferably of moulded synthetic resin, and if desired even the nut 11' and its boss 12 may be moulded from a synthetic resin.

From the above description it will be seen that the invention provides an effective form of lever-operated tap with a positive shut-off and locking action, but it should be understood that the invention is not limited solely to the details of the form described above which may be modified, in order to meet various conditions and requirements encountered, without departing from the scope of the invention.

What I claim is:

1. A tap for fluid flow control comprising a casing, movable sealing means and rack means associated therewith, worm means cooperating with said rack means, gear means connected to said worm means for rotating the latter and thus effecting movement of said rack means and sealing means between tap-closing and tap-opening positions, cooperating locking means, respectively on said worm means and said casing, adapted to be brought into locking engagement upon, and as a result of, termination of movement of said rack and sealing means to a tap-closing position for the purpose of opposing inadvertent tap-opening rotation of said worm means until positively initiated by actuation of the associated gearing.

2. A tap according to claim 1 wherein said rotatable worm means are so mounted as to allow a limited degree of axial movement.

3. A tap according to claim 1 wherein said locking means are brought into locking engagement as a result of limited axial movement of said worm means in relation to said casing at the end of a tap-closing operation.

4. A tap according to claim 1 wherein the said worm means are rotatably supported by a pin-and-socket mounting.

5. A tap according to claim 1 wherein said worm means at one end is supported by a tapered pin-and-socket mounting adapted to provide frictional locking engagement as a result of relative axial movement.

6. A tap according to claim 1 wherein said rack means is movable longitudinally by said worm means between tap-open and tap-closed positions, and comprising adjustable stop means for defining the limit of longitudinal movement of said rack means during a tap-opening operation.

7. A tap according to claim 1 comprising, as part of said gear means, a lever-operated internally-toothed ring.

8. A tap as claimed in claim 1 comprising a gear wheel rigidly associated with said worm means, through which said worm means are driven.

9. A tap according to claim 1 wherein said rack means and said worm means are moulded from a synthetic plastic material.

References Cited

UNITED STATES PATENTS 2,264,549 12/1941 Pecker _____ 74—424.6 X
3,026,741 3/1962 Schaverien _____ 74—424.8

DONLEY J. STOCKING, *Primary Examiner.*

L. H. GERIN, *Assistant Examiner.*